United States Patent [19]
Holmquist et al.

[11] Patent Number: 5,602,846
[45] Date of Patent: Feb. 11, 1997

[54] SIMULTANEOUS VOICE AND DATA CALL ESTABLISHMENT USING A SIMULTANEOUS VOICE AND DATA MODEM POOL AND PRIVATE BRANCH EXCHANGE FACILITIES

[75] Inventors: Kurt E. Holmquist, Largo; Richard K. Smith, Seminole, both of Fla.

[73] Assignee: Paradyne Corporation, Largo, Fla.

[21] Appl. No.: 225,295

[22] Filed: Apr. 8, 1994

[51] Int. Cl.$^6$ .................................................. H04J 3/12
[52] U.S. Cl. ......................... 370/384; 370/493; 379/93; 379/94
[58] Field of Search ...................... 370/110.1, 24, 370/28, 29, 32, 42, 53, 58.1, 60.1, 68.1, 91, 77; 379/94, 93, 219, 220, 224, 225, 229, 230, 240, 158, 160, 211, 42, 212, 96, 98; 375/261, 222

[56] References Cited

U.S. PATENT DOCUMENTS

| | | | |
|---|---|---|---|
| 3,903,373 | 9/1975 | Gueldenpfennig et al. | 379/203 |
| 4,691,345 | 9/1987 | McAlevey et al. | 379/158 |
| 4,862,456 | 8/1989 | Giorgio | 375/8 |
| 5,008,930 | 4/1991 | Gawrys | 379/212 |
| 5,081,673 | 1/1992 | Engelke et al. | 379/96 |
| 5,289,528 | 2/1994 | Ueno et al. | 379/212 |
| 5,428,608 | 6/1995 | Freeman et al. | 379/93 |
| 5,440,585 | 8/1995 | Partridge, III | 375/261 |

*Primary Examiner*—Wellington Chin
*Assistant Examiner*—Huy D. Vu
*Attorney, Agent, or Firm*—Thomas, Kayden, Horstemeyer & Risley

[57] ABSTRACT

A simultaneous voice and data (SVD) modem includes two analog ports and a data terminal port. Both of these analog ports are capable of transmitting telephone numbers and are coupled to a switching system like a private branch exchange (PBX). The data terminal port is coupled to a data terminal of an SVD user. In one embodiment of the invention, the SVD user, the calling party, sends at least one command to the SVD modem, via the data terminal port. In response, the SVD modem separately transmits, to the PBX, the calling party number from one of the analog ports and the called party number from the remaining analog port. The SVD modem then subsequently communicates any voice signals received on one of the analog ports to the other analog port. This allows a voice call to be switched through the SVD modem, yet requires no modification to the PBX.

18 Claims, 5 Drawing Sheets

CALLING SIGNAL

| SIGNAL NAME | TONE 1 | TONE 2 | SYMBOL RATE INDICATED |
|---|---|---|---|
| SVD CNG-a | 1550Hz @ -3dB | 825Hz @ -3dB | 3000 s/s |
| SVD CNG-b | 1550Hz @ -3dB | 875Hz @ -3dB | 2800 s/s |

ANSWER IDENTIFICATION SIGNAL*

| SIGNAL NAME | TONE 1 | TONE 2 | SYMBOL RATE INDICATED |
|---|---|---|---|
| SVD AID-a | 1000Hz @ -3dB | 801Hz @ -3dB | 3000 s/s |
| SVD AID-b | 1000Hz @ -3dB | 850Hz @ -3dB | 2800 s/s |

*FOLLOWED BY STANDARD 2100Hz ANSWER TONE

5,602,846

SIMULTANEOUS VOICE AND DATA CALL ESTABLISHMENT USING A SIMULTANEOUS VOICE AND DATA MODEM POOL AND PRIVATE BRANCH EXCHANGE FACILITIES

BACKGROUND OF THE INVENTION

The present invention relates to data communications equipment and, more particularly, to the simultaneous establishment of voice and data calls using a modem pool and private branch exchange facilities.

The co-pending, commonly assigned, U.S. Patent application of Gordon Bremer et al. entitled "Simultaneous Analog and Digital Communication," serial No. 08/076505, filed on Jun. 14, 1993, describes a simultaneous voice and data communications system in which a voice signal is added to a data signal for transmission over a communications channel to a receiving modem.

In this simultaneous analog and digital communication system, the data signal to be transmitted is represented by a sequence of data symbols, where each data symbol is associated with a particular N-dimensional signal point value taken from a signal space. Similarly, the analog signal, which is represented by a voice signal, is processed so that it is mapped into the N-dimensional signal space to provide a voice signal point. This voice signal point defines the magnitude and angle of a voice signal vector about the origin of the signal space. The data symbol and the voice signal vector are then added together to select a resultant N-dimensional signal point, which is then transmitted to a far-end modem.

Upon reception of the transmitted N-dimensional signal point, the receiver of the far-end modem detects the embedded data symbol and subtracts the data symbol from the received N-dimensional signal point to yield the voice signal vector. This voice signal vector is then used to recreate the voice signal.

As a result, this simultaneous voice and data transmission technique advantageously provides a voice-band signal that has both an audio portion and a data portion. This allows two users with simultaneous voice and data (SVD) capable modems to communicate data between them and talk at the same time—yet only requires one "tip/ting" type telephone line at each user's location. However, in a typical corporate environment voice and data communications are not yet integrated. Indeed, voice and data facilities are usually provided to the corporation's employees over physically separate wiring, where the voice communications is typically switched through a private branch exchange (PBX) and the data communications may be over a local area network (LAN). Consequently, when a corporate user makes a voice call, that voice call is directly switched through the PBX, and if an outside call, through the public switched telephone network (PSTN), to the called party. Similarly, if the corporate user makes a data call, that data call is switched through a modem-pool to the PBX. A modem pool is a data resource that is coupled to the PBX and shared among a group of individuals. This allows the corporation to provide its employees with access to data services without having to dedicate a modem to each employee. The end result is that in this type of telecommunications environment, a corporate user cannot directly connect their telephone to an SVD capable modem to establish a simultaneous voice and data connection with another SVD user.

SUMMARY OF THE INVENTION

We have realized a method and apparatus that allows a user to switch their voice call through an SVD-capable modem, even though the SVD-capable modem is remotely located behind a switching system. In particular, the modem includes two analog ports and a data terminal port. The modem is capable of originating signaling to the switching system through both of these analog ports to establish telephone calls between each analog port and communications equipment of a respective called party. The modem then bridges these telephone calls together so that each party, can converse with the other.

In one embodiment of the invention, the SVD modem receives call origination commands for both analog ports from a user's data terminal equipment, which is illustratively coupled by a local area network to the data terminal port of the SVD modem. For example, this allows a user to both ring their telephone and to ring the telephone of a called party thereby setting up a telephone call between each analog port of the SVD modem and the respective party. The SVD modem then bridges the two telephone calls together so that the user, effectively the calling party, can converse with the called party. This allows a voice call to be switched through the SVD modem, yet requires no modification to the switching system.

In another embodiment of the invention, the SVD modem receives a call origination command for one of the analog ports, e.g., the first analog port, from a secondary channel of an SVD connection. This SVD connection is established to a remote SVD modem of a remote user through the remaining analog port, e.g., the second analog port. This allows the remote user to "dial-out" of the switching system through the first analog port of the SVD modem. In this example, the SVD modem communicates the audio portion of a received SVD signal to the first analog port and, in the reverse direction, processes any incoming voice signal from the first analog port onto the audio portion of an SVD signal provided by the second analog port for transmission to the remote user.

DETAILED DESCRIPTION

Figure 1:
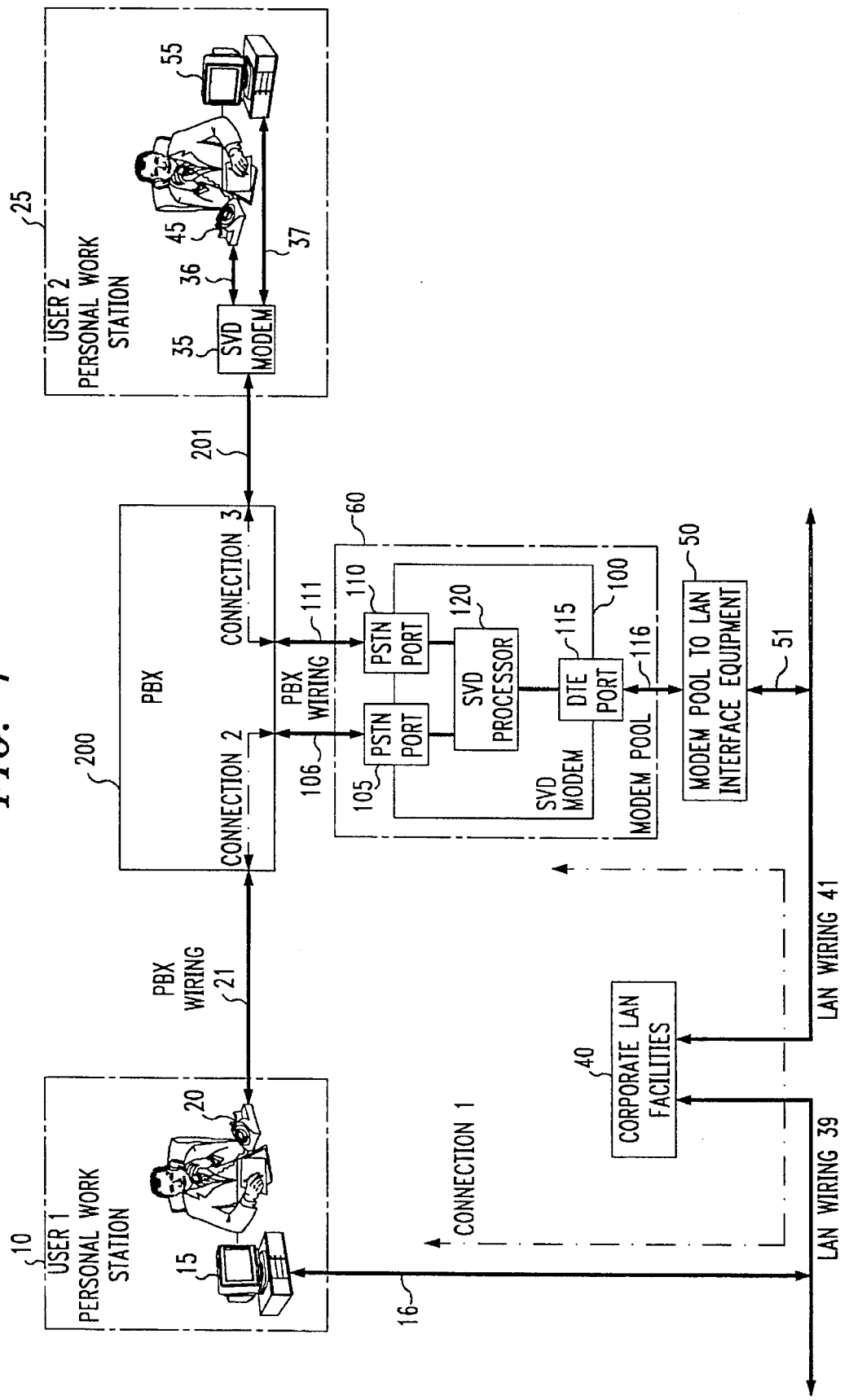
FIG. 1 shows a block diagram of a simultaneous voice and data communications system embodying the principles of the invention.

A block diagram of a portion of a simultaneous voice and data communications system is shown in FIG. 1. The system shown in FIG. 1 is representative of voice and data communications facilities provided at a large corporation's premises. Data communications functions are provided via LAN facility 40, which includes various types of bridging, routing, and interconnecting devices, and associated LAN wiring 39, as known in the art. Voice communications functions are provided by PBX 200 and associated wiring as represented by lines 21, 106, 111, and 201. The latter represents the telecommunications facility and any other switching equipment used by PBX 200 to place, or receive, a telephone call to another party, e.g., user 2. This telephone call can either be internal, e.g., within the corporation's building, or external, e.g., through the PSTN. A typical personal work station of a user, e.g., workstation 10 of user 1, is equipped with data terminal equipment that is represented by personal computer 15 and voice terminal equipment that is represented by telephone 20, each of which is connected to the appropriate internal network. Modem pool 60 is maintained as a centralized resource that is accessed on an as-needed basis by employees via LAN facility 40 and modem pool to LAN interface 50 as known in the art. Modem pool 60 includes at least one SVD-capable modem as represented by SVD modem 100. The latter is coupled to PBX 200 via lines 106 and 111.

SVD modem 100 includes DTE port 115 for coupling data signals to, and from, line 116, and two analog ports—PSTN port 105 and PSTN port 110. In accordance with the inventive concept, SVD modem 100 is capable of originating a telephone call to PBX 200 through each of these analog ports. In other words, both PSTN ports 105 and 110 sink current and provide hook switch closure like a "plain old telephone." Consequently, SVD modem 100 provides for originating, or answering, a call to, or from, PBX 200 via lines 106 and 111, respectively. (In contrast, a typical modem has a telephone port and a single line port. A user plugs the "tip/ring" jack from their telephone into the telephone port of the modem. This telephone port either sources current to the user's telephone or directly connects, i.e., bridges, the telephone to the line port of the modem. As a result, the modem does not provide for origination of a telephone, e.g., dialing, from the telephone port), Other than the inventive concept, the individual components of SVD modem 100 are well-known and are not described in detail. For example, SVD processor 120 includes a microprocessor, memory, digital signal processor, etc.; and provides both standard modem functionality, like conforming to CCITT V.32 and SVD functionality as described in the above-mentioned Bremer et al. patent application entitled "Simultaneous Analog and Digital Communication," Ser. No. 08/076505, filed on Jun. 14, 1993.

SVD modem 100 operates in either a "voice-only" mode, a "data-only" mode, or an SVD mode. The "voice-only" mode simply communicates the signal, e.g., a voice signal, present on one analog port to the other. The "data-only" mode modulates a data signal received via DTE port 115 for transmission via PSTN port 110 to a remote data endpoint, and demodulates a modulated data signal received via PSTN port 110 for transmission to personal computer 15. Finally, the SVD mode provides the combination of the "voice-only" and "data-only" mode with the exception that the signal received and transmitted via PSTN port 110 is a combined voice and data signal (an SVD signal) as described earlier. It is assumed that SVD modem 100 is configured by user 1, e.g., through a "command-mode" interface via personal computer 15, to initially operate in the "voice-only" mode.

Figures 2, 3:
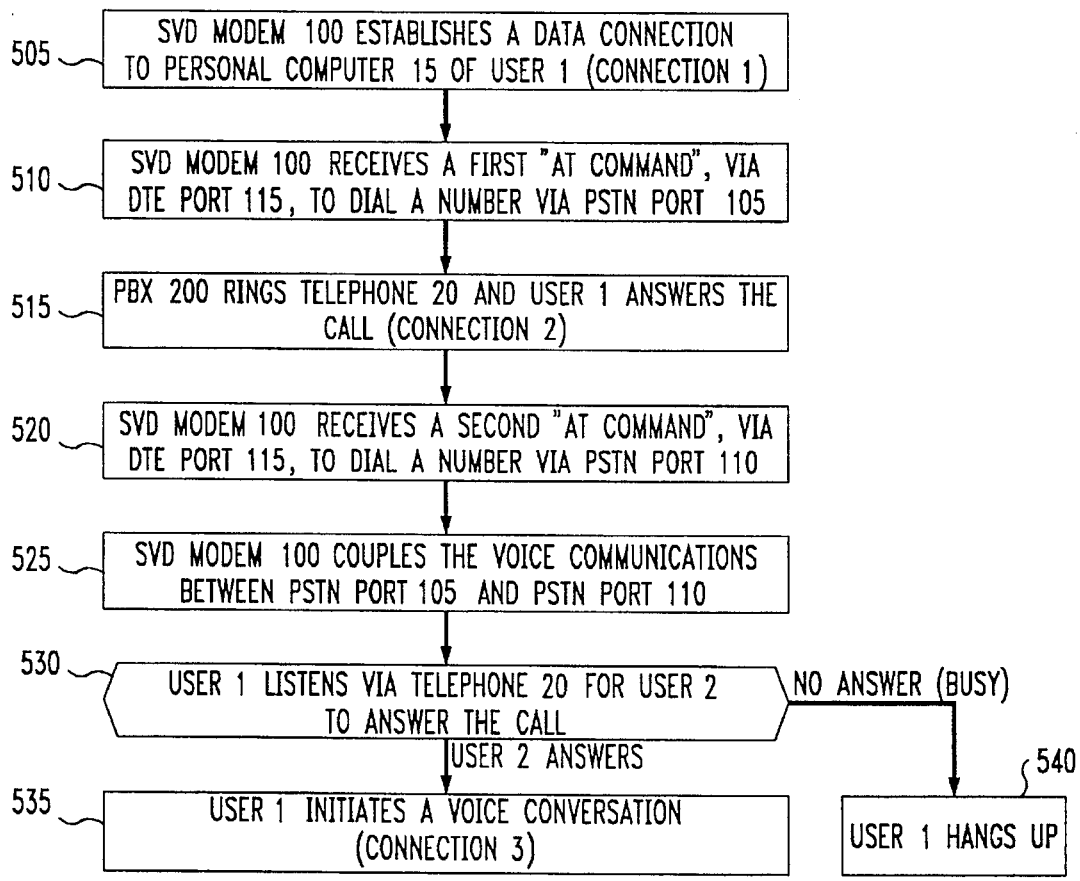
FIG. 2 is a table showing illustrative SVD identification signal assignments.
FIG. 3 is an illustrative flow diagram for initiating a voice call that embodies the principles of the invention.

Signaling between SVD-capable modems is accomplished by the use of SVD identification signals. This allows one SVD-capable modem to identify another SVD-capable modem. An illustrative set of distinctive identification signals for use by an SVD modem is shown in FIG. 2. These hand-shaking signals include a calling signal, SVD CNG, which includes calling tones "a" and "b," and an answer identification signal, SVD AID, which includes answering tones "a" and "b." The called SVD modem provides the answer identification signal as an acknowledgment to the calling SVD modem that the call has been answered by an SVD compatible modem.

Figure 4:
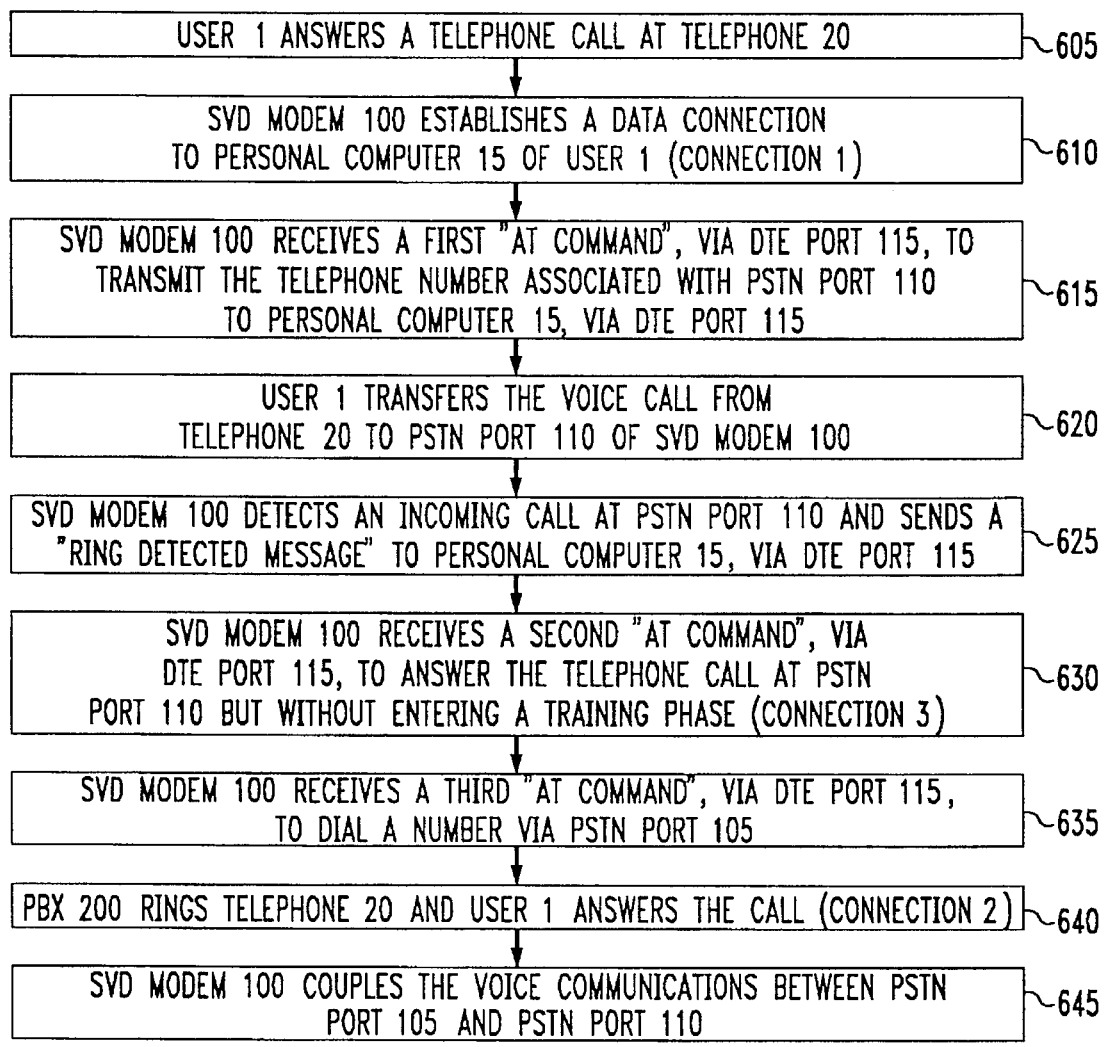
FIG. 4 is an illustrative flow diagram for receiving a voice call that embodies the principles of the invention.

The nature of the basic system architecture shown in FIG. 1 requires that different call establishment techniques be used for establishing the simultaneous voice and data communications (an SVD session) between user 1 and user 2 when originating as opposed to when answering a call. These are illustrated in FIGS. 3 and 4 and described in the following paragraphs. In the following description it is assumed that an SVD session between user 1 and user 2 begins with a "plain old telephone service" (POTS) voice conversation between these parties.

An illustrative flow diagram for use in SVD modem 100 for establishing a voice call through an SVD modem when user 1 is the calling party is shown in FIG. 3. When user 1 wants to initiate a conversation with another user that may develop into an SVD session (this assumes that user 2 has SVD capability), user 1 obtains access to SVD modem 100 via LAN 40 and modem pool to LAN interface equipment 50. At this point, in step 505, SVD modem 100 establishes a data connection to personal computer 15 of user 1, hereafter referred to as "connection 1." This provides an asynchronous data path from the personal computer 15 to SVD modem 100. User 1 then issues a dialing command, via "connection 1," that is received by SVD modem 100 in step 510. This dialing command is transmitted to SVD modem 100 as a new type of "AT command" and includes a telephone number and identifies the analog port for SVD modem 100 to use. In this case, the analog port is PSTN port 105 and the telephone number is that number associated with user 1, i.e., user 1 is calling their own telephone. SVD modem 100 dials the number via PSTN port 105. This causes PBX 200 to ring telephone 20, upon which user 1 answers the call in step 515. This establishes "connection 2"—a voice call between user 1 and PSTN port 105 of SVD modem 100.

After answering the telephone, user 1 then issues another dialing command, via "connection 1," that is received by SVD modem 100 in step 520. This dialing command includes the telephone number of user 2 and identifies PSTN port 110. This second command is terminated with a semicolon so that, according to the "AT command" conventions, SVD modem 100 just dials the number but does not directly go into a training phase with any equipment of the remote endpoint after the physical connection is established. After dialing the second telephone number, SVD modem 100 couples the voice communications between PSTN port 105 and PSTN port 110 in step 525. As a result, any signal on one analog port is communicated to the other analog port. Since SVD modem 100 just completed dialing the called party telephone number, user 1 as this time hears a ringing signal through the receiver of telephone 20 in step 530. If user 2 answers the call, which establishes "connection 3," user 1 then initiates a voice conversation in step 535. However, if user 2 does not answer (or it is busy), then user 1 terminates the call by simply hanging up telephone 20 in step 540. Upon detecting dial tone from PBX 200, SVD modem 100 similarly disconnects PSTN ports 105 and 110, i.e., hangs-up. Alternatively, user 1 can provide an "AT command" via the data channel to disconnect SVD modem 100.

Once user 1 is talking to user 2, as shown in FIG. 1, the voice call is switched through SVD modem 100—yet no modification to PBX 200 is required. If it is desired to transition the telephone call from "voice-only" to voice plus data, i.e., SVD mode, then user 1, or user 2, appropriately signals their respective SVD modem to switch modes, e.g., by a predefined "AT command," or as described in the copending commonly assigned U.S. Patent applications of Chapman et at. entitled "Call Establishment for Simultaneous Analog and Digital Communications," Ser. No. 08/153009, filed on Nov. 12, 1993; and Bremer et at. entitled "Side-Channel Communications in Simultaneous Voice and Data Transmission," Ser. No. 08/151686, filed on Nov. 15, 1993. For example, to establish an outbound data call in the middle of a voice session, SVD modem 100, in response to the predefined "AT command," sends an SVD calling signal to the remote SVD-capable modem. Unfortunately, this data signaling temporarily interrupts the voice conversation between user 1 and user 2. However, since user 1 is initiating the data call by entering the "AT command," user 1 can simply ask user 2 to "hold-on" while a data call is established. The length of interruption to the voice call is a function of the length of time to set up the data connection, i.e., how long it takes for SVD modem 100 and the remote SVD-capable modem to "train-up." For conventional end-to-end training this can be on the order of seconds. After the training process, the voice conversation between user 1 and user 2 is switched over to the audio portion, or voice channel, of the SVD link, and an SVD session has been initiated between user 1 and user 2 over "connection 3."

After the establishment of the data portion of the SVD session, SVD modem 100 receives two types of signals for transmission to user 2—a data signal from personal computer 15 and a voice signal from telephone 20. SVD modem 100 encodes both the data signal and the voice signal to provide a combined voice and data signal (the transmitted SVD signal) for transmission, via line 111, PBX 200, and line 201, to the telecommunications equipment of user 2. In the reverse direction, SVD modem 100 receives an SVD signal and provides the received data signal to personal computer 15, via LAN facility 40, and lines 41, 39, and 16; and provides the received voice signal to telephone 20, via line 106, PBX 200, and line 21.

It should be noted that SVD modem 100 reports the completion of the dialing commands back to personal computer 15 via the LAN channel. Consequently, since the first number to call is always the same, the entire process of setting up the voice call can easily be automated via software executing on personal computer 15.

An illustrative flow diagram for use in SVD modem 100 for establishing a voice call when user 1 is the called party is shown in FIG. 4. In step 605, user 1 answers a telephone call by picking up the receiver of telephone 20. It is assumed that this telephone call was originated by user 2. When user 1 wants to switch this voice conversation through an SVD-capable modem, user 1 obtains access to SVD modem 100 via LAN 40 and modem pool to LAN interface equipment 50. At this point, in step 610, SVD modem 100 establishes a data connection to personal computer 15 of user 1, hereafter referral to as "connection 1." This provides an asynchronous data path from the personal computer 15 to SVD modem 100. User 1 then issues a predefined "AT command," which is received by SVD modem 100 in step 615. This predefined "AT command" queries SVD modem 100 as to the internal telephone number that is associated with PSTN port 110 of SVD modem 100. The telephone number of PSTN port 110 can be stored in non-volatile memory of SVD modem 100 (similar to any modem's capability to store frequently dialed telephone numbers). This information can be storm in SVD modem 100 by an administrator of PBX 200 after the assignment of telephone numbers to SVD modem 100. Other arrangements for retrieving this type of information are also possible, e.g., SVD modem 100 can provide an identification code to user 1, who then consults a directory; or SVD modem 100 could itself query PBX 100 by using a suitably defined "in-band" signaling scheme, e.g., a predefined special sequence of touch-tones (dual tone multifrequency signaling). After receiving the telephone number of PSTN port 110, user 1 transfers the voice call from telephone 20 to PSTN port 110 in step 620. The transfer is accomplished using the transfer procedure of PBX 200, e.g., the depression of a transfer button on telephone 20 (not shown), followed by user 1 dialing the telephone number of PSTN port 110 and then hanging up, i.e., going "on-hook" at telephone 20. As known in the art, PBX 200 then attempts to transfer the telephone call by providing a ringing signal to PSTN port 110. In step 625, SVD modem 100 detects ringing at PSTN port 110 and reports this to user 1 via "connection 1." User 1 then issues another predefined "AT command," via "connection 1," that is received by SVD modem 100 in step 630. This predefined "AT command" instructs SVD modem 100 to answer the telephone call appearing at PSTN port 110. This predefined "AT command" is terminated with a semi-colon so that, according to the "AT command" conventions, SVD modem 100 just answers the call but does not go directly into a training phase with any equipment of the remote endpoint. This establishes "connection 3." User 1 then issues a third "AT command"—a dialing command, via "connection 1," that is received by SVD modem 100 in step 635. This dialing command includes the telephone number of telephone 20 and identifies PSTN port 105 as the analog port for SVD modem 100 to use. SVD modem 100 dials the number via PSTN port 105. This causes PBX 200 to ring telephone 20, upon which user 1 answers the call in step 640. This establishes "connection 2"—a voice call between user 1 and PSTN port 105 of SVD modem 100. After dialing the telephone number, SVD modem 100 couples the voice communications between PSTN port 105 and PSTN port 110 in step 645. As a result, any signal on one analog port is communicated to the other analog port. Since SVD modem 100 just completed dialing the called parties telephone number, user 1 at this time can restart the voice conversation with user 2. If desired, user 1 or user 2 can subsequently develop the voice call into an SVD call as described earlier.

Once again, because SVD modem 100 keeps personal computer 15 informed of its status via the LAN connection, with the exception of the call transfer operation, the process of setting up this voice call can also be largely automated via the use of software executing on personal computer 15.

Figure 5:
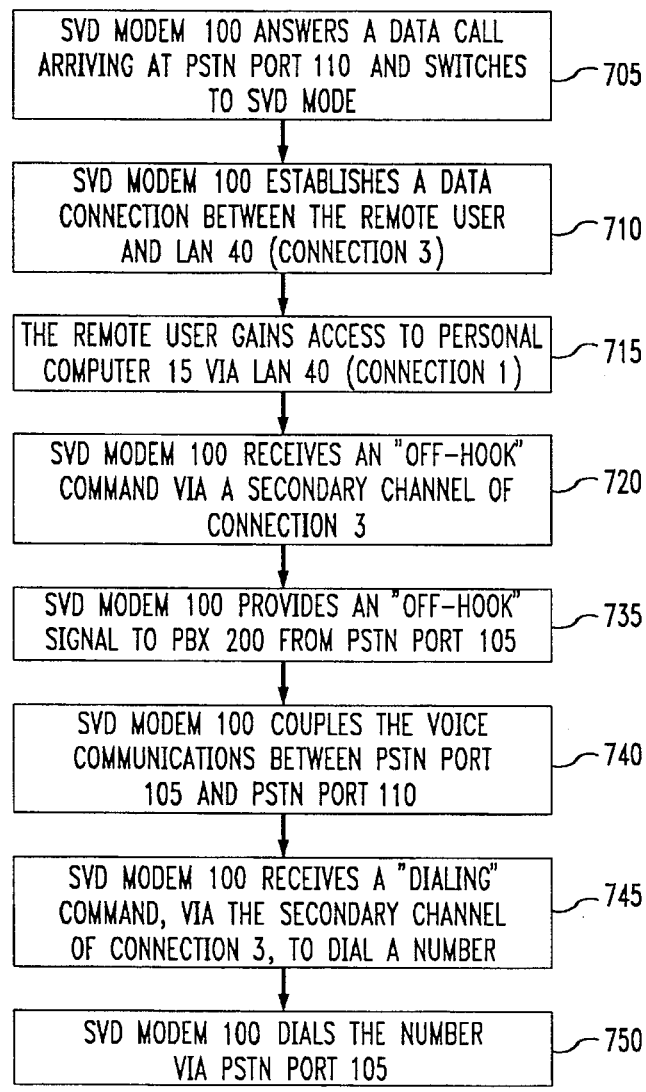
FIG. 5 is an illustrative flow diagram for remotely accessing the facilities of a switching system through an SVD-capable modem embodying the principles of the invention.

In addition, as illustrated in FIG. 5., the inventive concept also allows a remote user to remotely access the telecommunications facilities provided by PBX 200. In this example, it is assumed that user 1 is not present at personal work station 10 and that user 2 is "telecommuting," i.e., working at home and accessing his work computer as represented by personal computer 15. User 2 first initiates a data call by causing SVD modem 35 to dial the telephone number of SVD modem 100, e.g., the number associated with PSTN port 110. SVD modem 100 answers the telephone call and establishes a data connection with SVD modem 35, i.e., "connection 3." As described earlier, each SVD modem can identify that the other modem is SVD-compatible by the use of the SVD identification signals shown in FIG. 2. As a result of this identification, each SVD modem switches to an SVD mode of operation where an SVD signal is communicated between SVD modem 100 and SVD modem 35. In this case, the audio portion of the SVD signal is idle as no voice call is yet in progress. At this point, SVD modem 100 provides user 2, via DTE port 115, with access to LAN 40. Typically, user 2 is prompted for information, like "log-in" and "password," by an appropriate "log-on" sequence executed by LAN 40. It is assumed that as a result of successfully passing this "log-on" sequence, user 2 gains access to personal computer 15 thereby establishing "connection 1" in step 715. For the purposes of this example, personal computer 15 is powered-up and running a software program that enables remote access via line 16.

Figure 6:
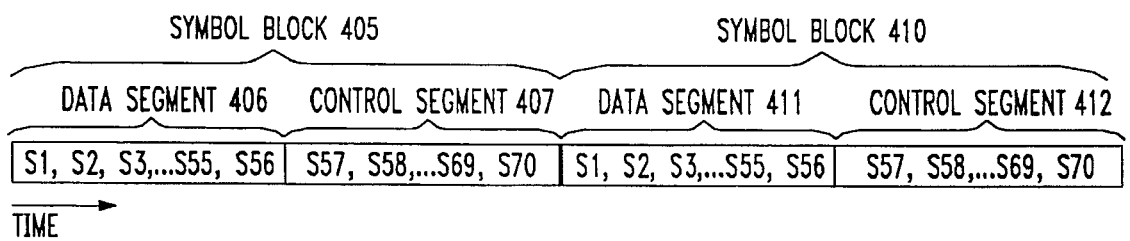
FIG. 6 is an illustrative SVD symbol block illustrating the use of a secondary channel.

As is sometimes the case, user 2 may need to make a telephone call to another person while accessing personal computer 15. In order initiate another telephone call, user 2 goes "off-hook" at telephone 45. This "off-hook" signal is detected by SVD modem 35 and transmitted to SVD modem 100 via an SVD secondary channel in step 720. The SVD secondary channel communicates signaling information between SVD modem 100 and SVD modem 35 and can be implemented in any number of ways. For example, as is known in the art, a secondary channel can be provided by multiplexing the data modulated signal (here the SVD signal) with another control signal; or a secondary channel can be provided as described in the co-pending, commonly assigned, U.S. Patent application of Bremer et at. entitled "Side-Channel Communications in Simultaneous Voice and Data Transmission," Ser. No. 08/151686, filed on Nov. 15, 1993. FIG. 6 shows a diagram of a transmission scheme that includes a side-channel within an SVD signal. This SVD side-channel not only provides for the transport of additional information between any SVD endpoints—but also allows the voice signal to be transmitted across the full bandwidth of the SVD data connection. As can be observed from FIG. 6, information from an SVD modem is provided in a frame, or "symbol block," e.g., symbol block 405. For the purposes of this example, a symbol block comprises 70 symbols. Consecutive symbols within each symbol block are identified as S1, S2, S3, . . . , S70. Each symbol block is further divided into a data segment, e.g., data segment 406; and a control segment, e.g., control segment 407. Let the group of symbols in the data segment be S1 to S56. These are the "data symbols" and always convey DTE data. For the purposes of the following discussion the symbol rate is illustratively 3000 symbols/second (s/sec.), although other symbol rates may be used, e.g., 2800 s/sec. At a symbol rate of 3000 s/sec., the average data symbol rate of a symbol block is equal to (56/70)×3000)=2400 s/sec. Consequently, if there are 6 bits of data per data symbol, the resultant data rate is 14400 bits/sec (bps). It is assumed that this data rate is high enough to meet a user's needs so that the remaining bandwidth of the SVD data connection can be allocated to the control segment, which provides the side-channel.

The remaining symbols of the control segment, i.e., S57 to S70, are the "control symbols." Usually, the latter never convey DTE data, but convey control information. Each control symbol represents a number of "control bits." The control symbols are encoded and scrambled the same as the DTE data symbols, e.g., they use the same signal space. The control symbols provide the side-channel for conveying additional signaling information between SVD modem 100 and SVD modem 35. Although the data symbols represent user data and the control symbols represent control information, both the data and control symbols may also convey analog data, which in this example is any voice signal that is provided to SVD modem 100 by telephone 20. As a result, the side-channel is a part of the simultaneous voice and data transmission.

Referring back to FIG. 5, after receiving the "off-hook" signal from SVD modem 35, SVD modem 100 provides an "off-hook" signal to PBX 200 from PSTN port 105 in step 735. SVD modem 100 then couples any analog signal appearing at PSTN port 105 to PSTN port 110 in step 740. As a result, any dial-tone signal provided by PBX 200 after PSTN port 105 has gone "off-hook" is transmitted via the audio portion of the SVD signal transmitted by SVD modem 100 to SVD modem 35. This allows user 2 to hear the dial-tone signal provided by PBX 200. User 2 then issues a new type of "AT dialing command" to SVD modem 35. This "AT dialing command" includes a telephone number. SVD modem 35 upon receiving this "AT dialing command" simply transmits this command to SVD modem 100 via the SVD secondary channel. SVD modem 100 receives this "AT dialing command" in step 745. SVD modem 100 then dials the telephone number via PSTN port 105 in step 750. When the called party answers, "connection 2" is established between the called party and user 2 through SVD modem 100. As can be observed, this method allows a remote user to gain full-access to the telecommunications facilities of PBX 200. Consequently, in the case of an employee working at home, the employee advantageously does not have to bear the cost of any work-related telephone calls other than the initial data call.

It should be noted that instead of sending a separate dialing command via the SVD secondary channel, user 2 can simply dial the number from telephone 45 because any voice-band signals from telephone 45 are simply transmitted via the audio portion of the SVD channel to SVD modem 100. The latter then demodulates the received SVD signal and provides the audio portion of the SVD signal, e.g., the touch-tones selected by user 2, to PBX 200, via PSTN port 105.

Figure 7:
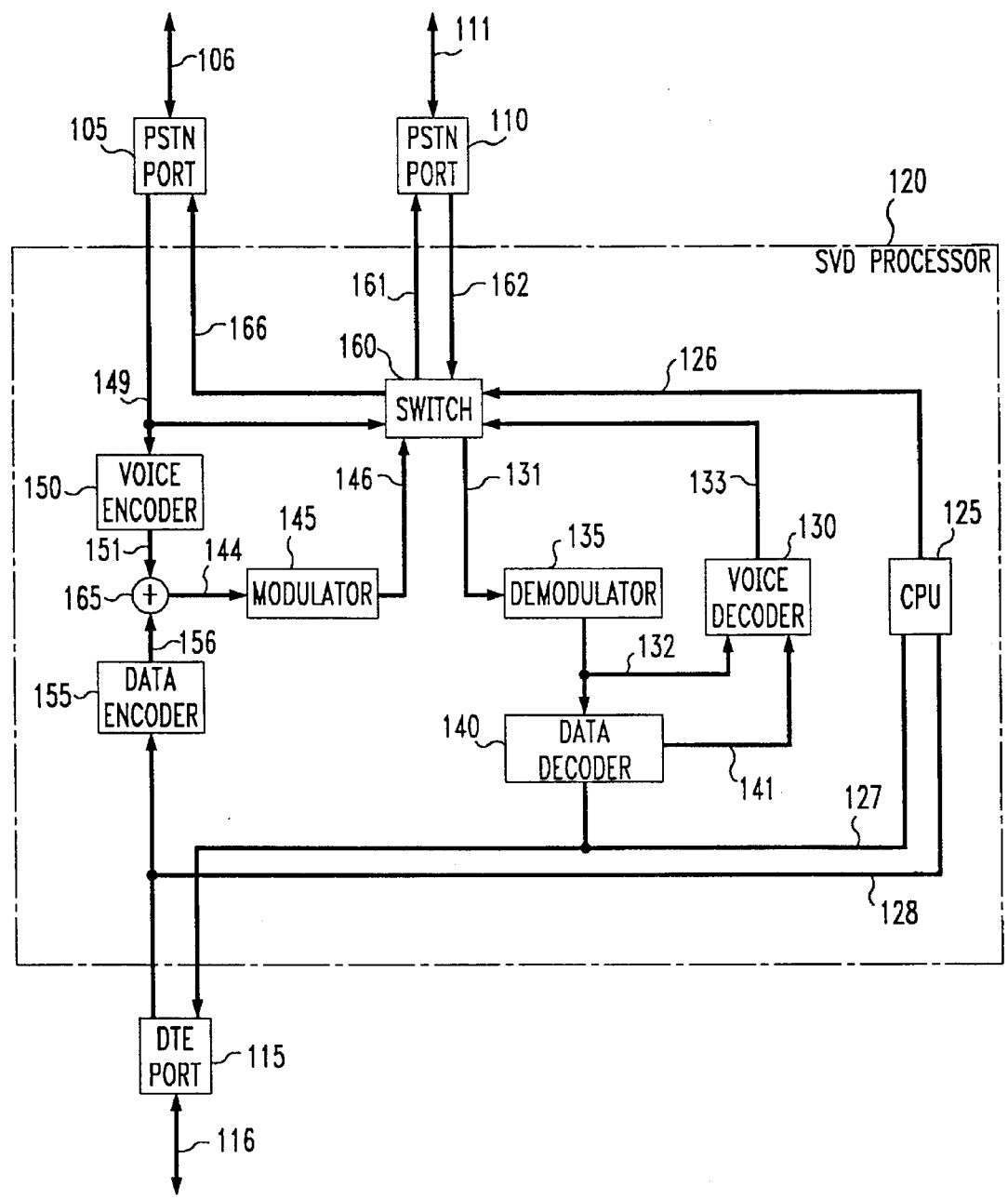
FIG. 7 is an illustrative block diagram of SVD processor 120 of SVD modem 100.

FIG. 7 shows an illustrative block diagram of SVD processor 120 of SVD modem 100 for bridging the signals between PSTN ports 105 and 110. Other than the inventive concept, the individual components of SVD modem 100 are well-known and are not described in detail. For example, CPU 125 is a microprocessor-based central processing unit, memory, and associated circuitry for controlling SVD modem 100.

In accordance with the inventive concept, CPU 125 controls switch 160, via line 126, as a function of the type of the operating mode of SVD modem 100. For example, if SVD modem 100 is in the "voice-only" mode, switch 160 couples any signal on line 162 to line 166 for transmission via PSTN port 105, and couples any signal on line 149 to line 161 for transmission via PSTN port 110. The remaining components, e.g., data encoder 155, data decoder 140, voice decoder 130, and voice encoder 150, are disabled by control signals from CPU 125 (not shown). Consequently, in the "voice-only" mode any analog signal appearing at one of the PSTN ports is coupled, or bridged, to the other PSTN port.

If SVD modem 100 is in the "data-only" mode, switch 160 couples any signal on line 146 to line 161 for transmission via PSTN port 110, and couples any signal on line 162 to line 131. In the "data-only" mode, voice encoder 150 and voice decoder 130 are disabled by control signals from CPU 125 (not shown). In this mode of operation, any data signal appearing at DTE port 115 (assuming SVD modem 100 is not receiving "AT commands") is encoded by data encoder 155. The latter includes any of the well-known encoding techniques like scrambling, trellis-coding, etc., to provide a sequence of symbols on line 156 at a symbol rate, 1/T to modulator 145. The symbols are selected from a signal space (not shown). Note, since voice encoder 150 is disabled, no signal is added by adder 165 to the output signal from data encoder 155. Modulator 145 illustratively provides a quadrature amplitude modulated signal (QAM) to PSTN port 110 via switch 160. Similarly in the reverse direction, a QAM signal received at PSTN port 110 is provided to demodulator 135 via switch 160. De modulator 135 provides an encoded data stream to data decoder 140. The latter performs the inverse function of data encoder 155 and provides a received data signal to DTE port 115 for transmission to personal computer 15 via LAN 40.

Finally, if SVD modem 100 is in the "SVD" mode, similar to the "data-only" mode, switch 160 couples any signal on line 146 to line 161 for transmission via PSTN port 110, and couples any signal on line 162 to line 131. In the SVD mode, voice encoder 150 and voice decoder 130 are enabled by control signals from CPU 125 (not shown). In this mode, any analog signal, e.g., a voice signal, appearing on line 149 is applied to voice encoder 150, which provides a sequence of two-dimensional signal points, at the predefined symbol rate of 1/T symbols per sec., on line 151. Each two-dimensional signal point represents a "voice signal vector" about the origin of a signal space (not shown). Adder 165 adds each voice signal vector on line 151, if any, to a respective one of the symbols provided by data encoder 155 to provide a stream of signal points to modulator 145. As described above, modulator 145 provides a QAM modulated signal to PSTN port 110 via switch 160. This QAM modulated signal is the above-mentioned SVD signal since it represents both voice and data.

In the reverse direction, the received SVD signal on line 131 is processed as described above by demodulator 135 and data decoder 140 to provide the received data signal on line 127. In addition, voice decoder 130 receives both the received signal point sequence from demodulator 135 and the decoded symbol sequence from data decoder 140. Voice decoder 130 includes suitable buffering to allow for the decoding time needed by data decoder 140 to make a decision as to a received symbol. Voice decoder 130 subtracts the received symbol provided by data decoder 140 from the respective received signal point provided by demodulator 135 and then performs the inverse function of voice encoder 150 to provide a received voice signal to PSTN port 105, via line 133, switch 160 and line 166. As a result, in the SVD mode any analog signal appearing at PSTN port 105 is effectively coupled, or bridged, to PSTN port 110 as part of the transmitted SVD signal provided by modulator 145. Similarly, the analog portion of the received SVD signal is provided to PSTN port 105.

The foregoing merely illustrates the principles of the invention and it will thus be appreciated that those skilled in the an will be able to devise numerous alternative arrangements which, although not explicitly described herein, embody the principles of the invention and are within its spirit and scope.

For example, although the invention is illustrated herein as being implemented with discrete functional building blocks, e.g., an SVD processor, one or more of those building blocks can be carried out using one or more appropriate programmed processors, e.g., a digital signal processor.

In addition, although a PBX was described in the above embodiment, any switching equipment can be used, e.g., even a low-end key telephone system that provides only a few extensions. Also, even though a LAN was used to illustrate data communications, the modem-pool could also be accessed through a computer facility, e.g., a mainframe, to which the employees have access from their data terminals. Further, although the calling and called party telephone numbers were provided via an illustrative "AT command," it should be realized that these telephone numbers could be stored in the modem. Finally, although SVD modem 100 included two analog ports through which SVD modem 100 could originate telephone calls, it should be realized that the ports could be digital.

We claim:

1. A modem comprising:

a first port of the modem for coupling to a switching system;

a second port of the modem for coupling to the switching system; and means for originating signaling to the switching system through each of the ports of the modem to establish telephone calls between each port and a respective called party wherein the means for originating bridges the respective called parties together;

wherein the means for originating receives a simultaneous voice and data signal from the second port, and further demodulates the received simultaneous voice and data signal to provide a voice signal to the first port.

2. The modem of claim 1 further including a data terminal interface for receiving at least one command from data terminal equipment coupled thereto, wherein the means for originating dials a telephone number of the respective called party from each port in response to receiving the command.

3. The modem of claim 1 wherein the means for originating further demodulates the received simultaneous voice and data signal to provide a data signal to a data terminal equipment port.

4. A method for establishing a voice call for use in a modem, the method comprising the steps of:

receiving at least one command via a data terminal equipment port of the modem;

responsive to the received command, transmitting a first telephone number via a first analog port of the modem and a second telephone number via a second analog port of the modem, where both analog ports are coupled to a switching system; and subsequently communicating a voice signal appearing at one of the analog ports to the other of the analog ports of the modem.

5. The method of claim 4 wherein the receiving step includes the steps of:

receiving a first command that includes the first telephone number and identifies the first analog port; and receiving a second command that includes the second telephone number and identifies the second analog port.

6. The method of claim 4 further including the step of receiving, via the second analog port, a simultaneous voice and data signal.

7. The method of claim 6 further including the step of demodulating the received simultaneous voice and data signal to provide a data signal to the data terminal equipment port of the modem.

8. A method for establishing a voice call for use in a modem, the method comprising the steps of:

receiving a first command via a data terminal equipment port of the modem;

responsive to the first command, answering a first telephone call appearing at a first analog port of the modem, where the first analog port is coupled to a switching system;

receiving a second command via the data terminal equipment port of the modem;

responsive to the second command, transmitting a telephone number via a second analog port coupled to the switching system; and subsequently establishing a voice connection between the first analog port and the second analog port of the modem.

9. The method of claim 8 wherein the second command includes the telephone number.

10. The method of claim 8 further including the step of receiving, via the second analog port, a simultaneous voice and data signal after the step of establishing the voice connection.

11. The method of claim 10 further including the step of demodulating the received simultaneous voice and data signal to provide a data signal to the data terminal equipment port of the modem.

12. A method for establishing a voice call though a modem, the method comprising the steps of:

establishing a first voice call between a first party and a second party through a switching system;

transferring the first voice call from a voice terminal of the first party to a first analog port of the modem; and causing the modem to initiate a second telephone call to the first party by the modem dialing a telephone number from a second analog port of the modem;

wherein both analog ports are coupled to the switching system, and upon the called party answering the second telephone call a second voice call exists between the called party and the second party through the first and second analog ports of the modem.

13. The method of claim 12 wherein the causing step includes the step of sending at least one command to the modem, via a data terminal equipment interface of the modem, to initiate the second telephone call.

14. A method for use in a modem for establishing a voice call through a modem, the method comprising the steps of:

establishing through a first analog port of the modem a communications channel between the modem and a remote modem;

detecting from the communications channel a first off-hook signal from the remote modem;

providing a second off-hook signal at a second analog port of the modem, where the second analog port is coupled to a switching system; and subsequently providing a telephone number from the second analog port to the switching system.

15. The method of claim 14 wherein the telephone number is first received in the modem via the communications channel.

16. The method of claim 14 wherein after the step of providing the off-hook signal, the modem communicates audio signals between the first analog port and the second analog port.

17. The method of claim 16 including the steps of:

receiving an audio signal from the second analog port; and transmitting a voice signal to the remote modem via the first analog port, where the voice signal carries information representing the received audio signal.

18. The method of claim 14 including the steps of:

demodulating a received simultaneous voice and data signal from the first analog port to provide a data signal and an audio signal;

transmitting the audio signal to the switching system from the second analog port; and providing the data signal to a data terminal equipment port of the modem.

* * * * *